(12) United States Patent
Noga

(10) Patent No.: US 7,171,561 B2
(45) Date of Patent: Jan. 30, 2007

(54) METHOD AND APPARATUS FOR DETECTING AND EXTRACTING FILEPRINTS

(75) Inventor: Andrew J. Noga, Rome, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 909 days.

(21) Appl. No.: 10/273,108

(22) Filed: Oct. 17, 2002

(65) Prior Publication Data

US 2004/0078574 A1    Apr. 22, 2004

(51) Int. Cl.
  *H04L 9/00*   (2006.01)
  *H04B 1/69*   (2006.01)
(52) U.S. Cl. .................................................. 713/176
(58) Field of Classification Search ................. 713/176
  See application file for complete search history.

(56) References Cited

U.S. PATENT DOCUMENTS

| | | | | |
|---|---|---|---|---|
| 5,257,211 | A * | 10/1993 | Noga | 702/60 |
| 5,581,658 | A * | 12/1996 | O'Hagan et al. | 706/20 |
| 6,266,479 | B1 * | 7/2001 | Kohri et al. | 386/68 |
| 6,453,252 | B1 | 9/2002 | Laroche | |
| 6,574,594 | B2 * | 6/2003 | Pitman et al. | 704/236 |
| 6,963,975 | B1 * | 11/2005 | Weare | 713/176 |
| 6,990,453 | B2 * | 1/2006 | Wang et al. | 704/270 |
| 2002/0083060 | A1 * | 6/2002 | Wang et al. | 707/10 |
| 2004/0172240 | A1 * | 9/2004 | Crockett et al. | 704/205 |
| 2005/0165732 | A1 * | 7/2005 | Burges | 707/1 |
| 2005/0232411 | A1 * | 10/2005 | Srinivasan et al. | 379/413 |
| 2005/0289065 | A1 * | 12/2005 | Weare | 705/51 |
| 2006/0122839 | A1 * | 6/2006 | Li-Chun Wang et al. | 704/273 |

OTHER PUBLICATIONS

Haitsma, Jaap and Kalker, Ton; "A Highly Robust Audio Fingerprinting System"; ISMIR 2002 3rd Int'l Conf. on Music Info. Retrieval, IRCAM Centere Pompidou, Paris, France, Oct. 13-17, 2002.
Website Article http://www.research.philips.com/InformationCenter/Global/FArticleDetail.asp entitled "Audio Fingerprinting", Philips Research, Konninklijke Philips Electronics N.V., 2002.

* cited by examiner

*Primary Examiner*—Nasser Moazzami
*Assistant Examiner*—Eleni Shiferaw
(74) *Attorney, Agent, or Firm*—Joseph A. Mancini

(57) ABSTRACT

Method and apparatus for processing data sequences for the purpose of data integrity assessment, data ownership demonstration and data authentication. An input data sequence is processed to extract what could be called naturally occurring digital watermarks. More appropriately, these naturally occurring digital watermarks are referred to herein as fileprints. Fileprints are data sequences that have been extracted from the input data sequence in a repeatable manner, and are with high probability unique to that input. In this sense, a fileprint can be used to identify which data sequence it came from, just as a human fingerprint can identify a particular person to which it belongs. Because the fileprints have not been embedded, they are not actually digital watermarks. However, fileprints can be used in a like fashion to digital watermarks for information protection.

20 Claims, 10 Drawing Sheets

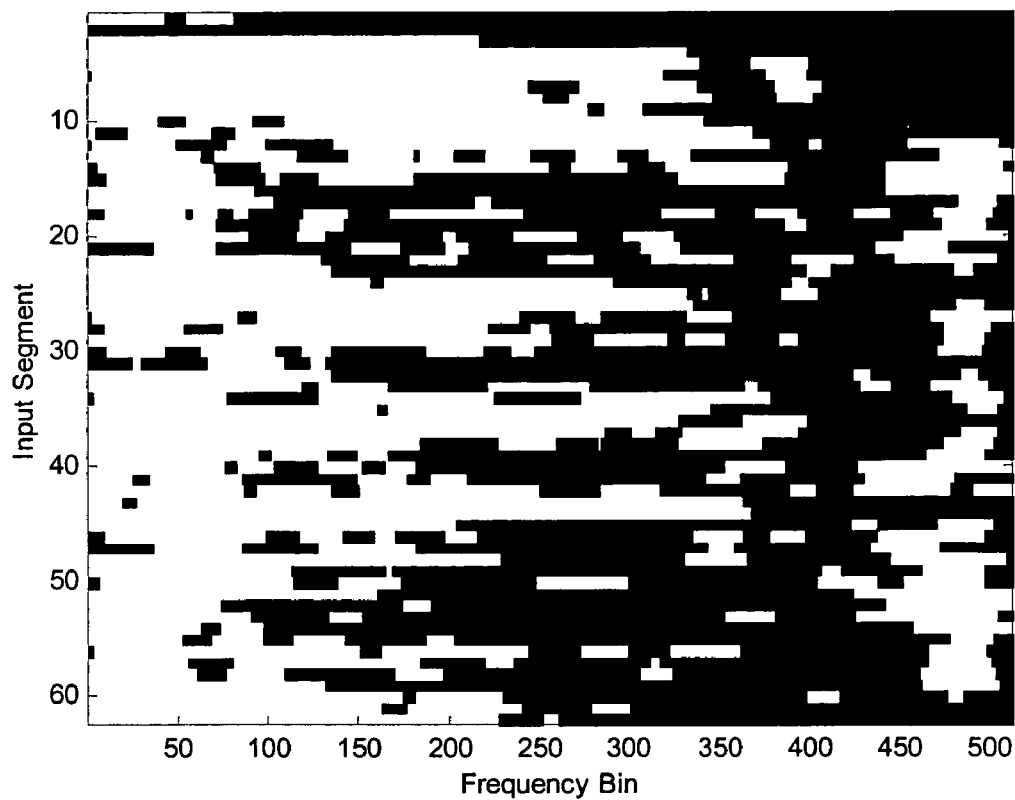
Figure 4(a). Stage 1 detections, a fileprint of file faks0__sa1.wav
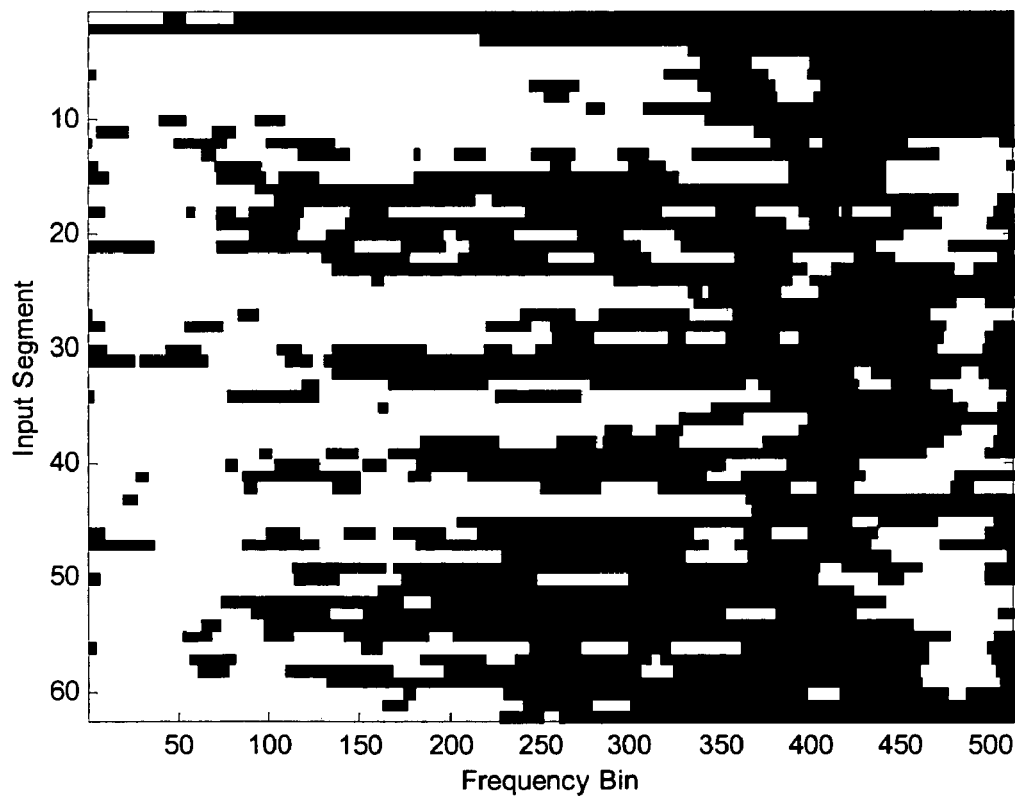
Figure 4(b). Stage 1 detections, a fileprint of file faks0__sa1lsbmod.wav

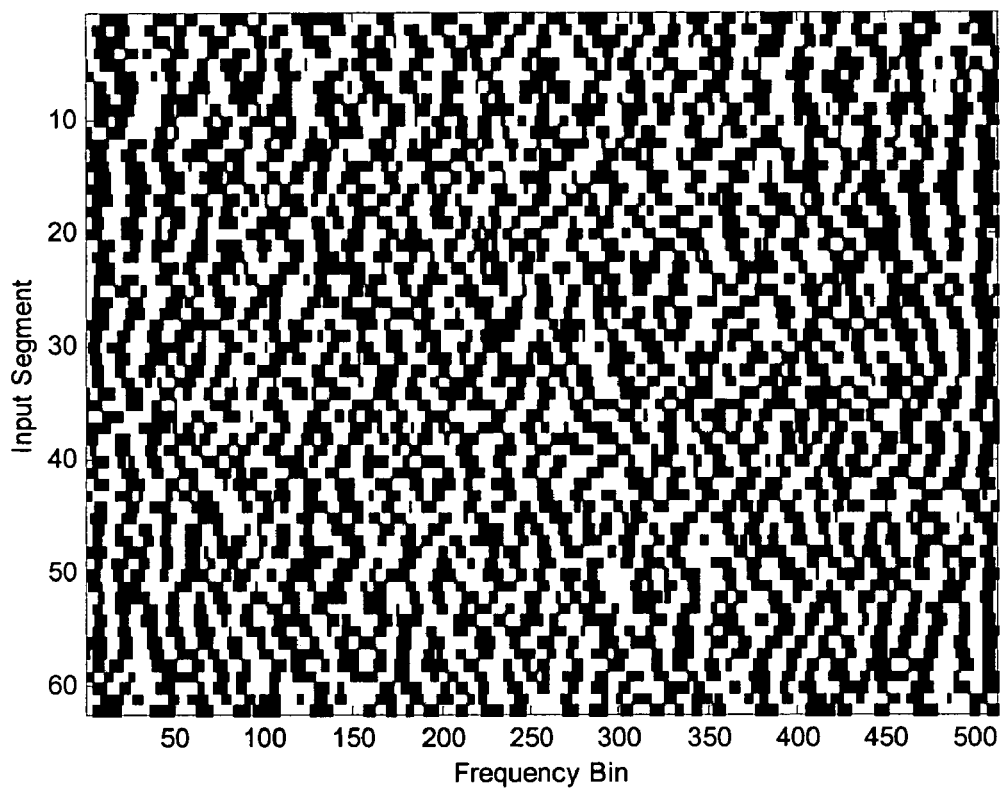
Figure 4(c). Stage 2 detections, a fileprint of file faks0__sa1.wav
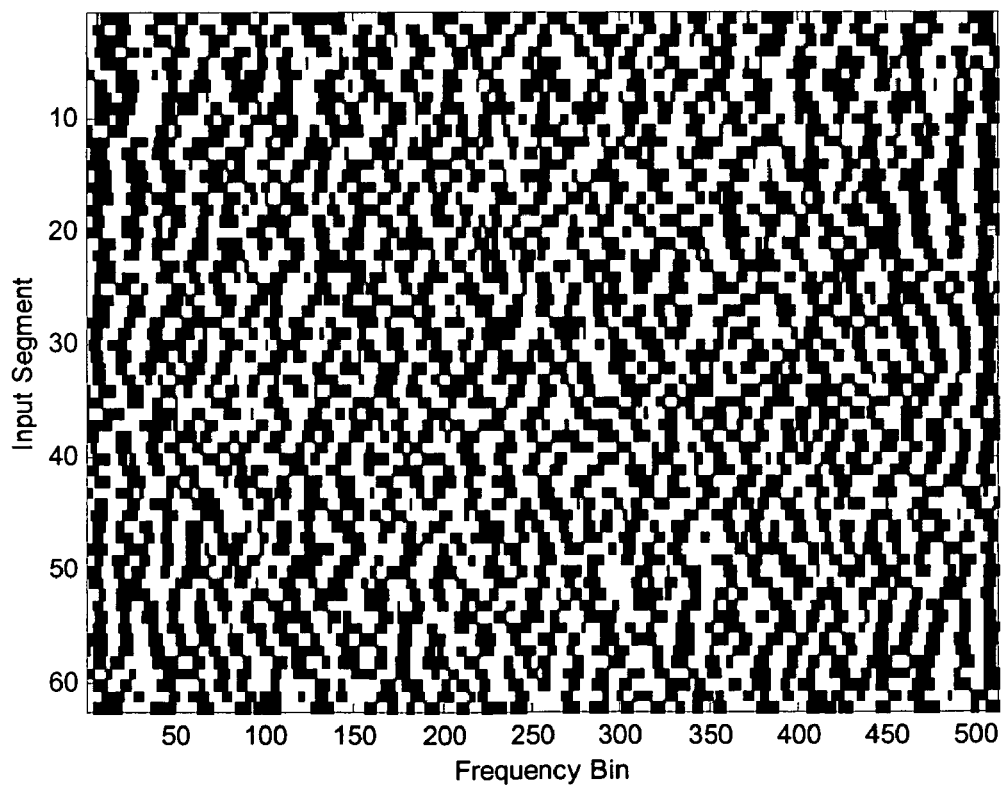
Figure 4(d). Stage 2 detections, a fileprint of file faks0__sa1lsbmod.wav

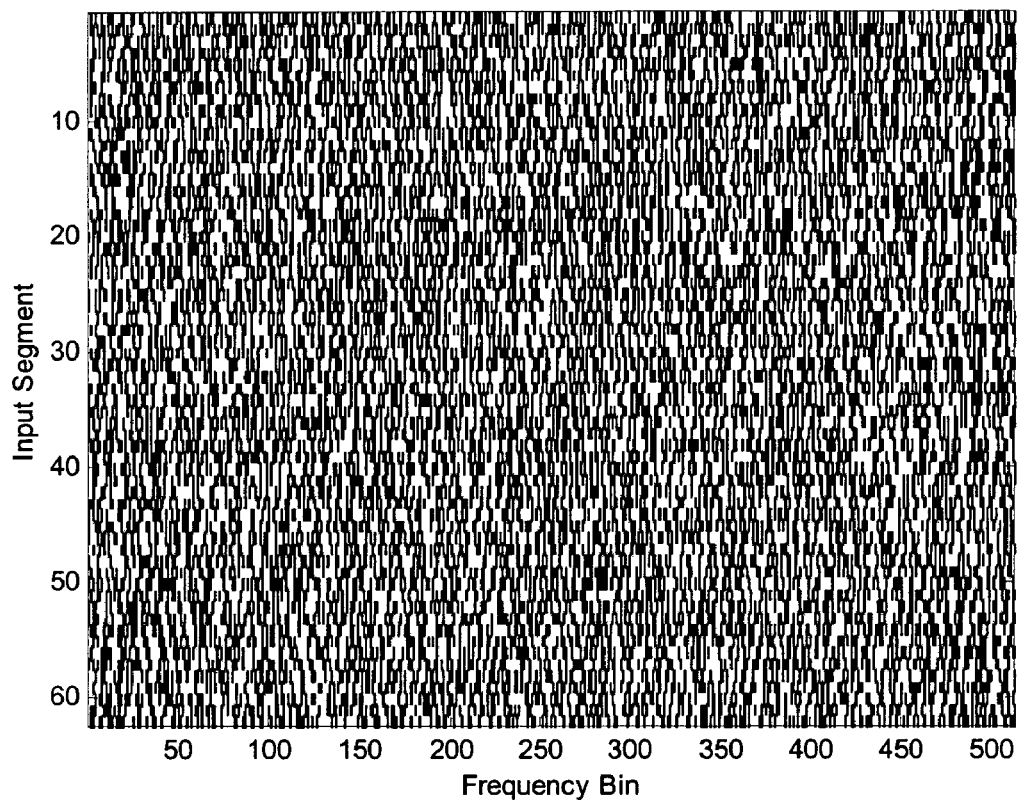
Figure 4(e). Stage 3 detections, a fileprint of file faks0__sa1.wav
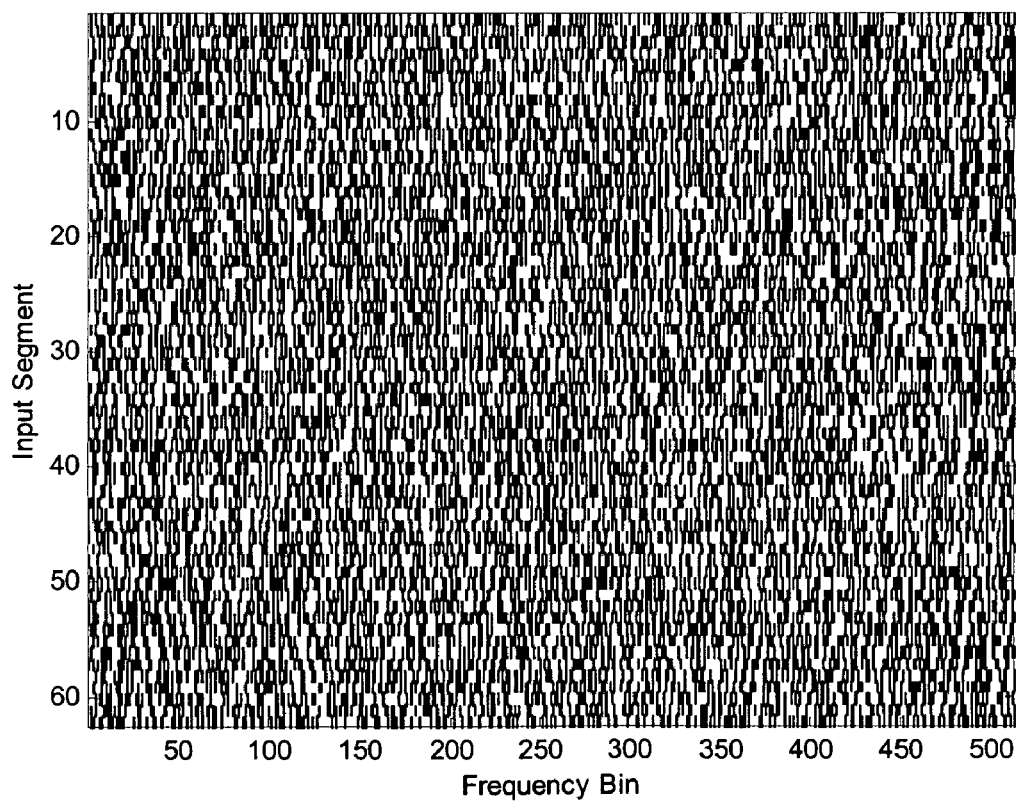
Figure 4(f). Stage 3 detections, a fileprint of file faks0__sa1lsbmod.wav Figure 5(a). Stage 1 detections, a partial fileprint of file lena.bmp
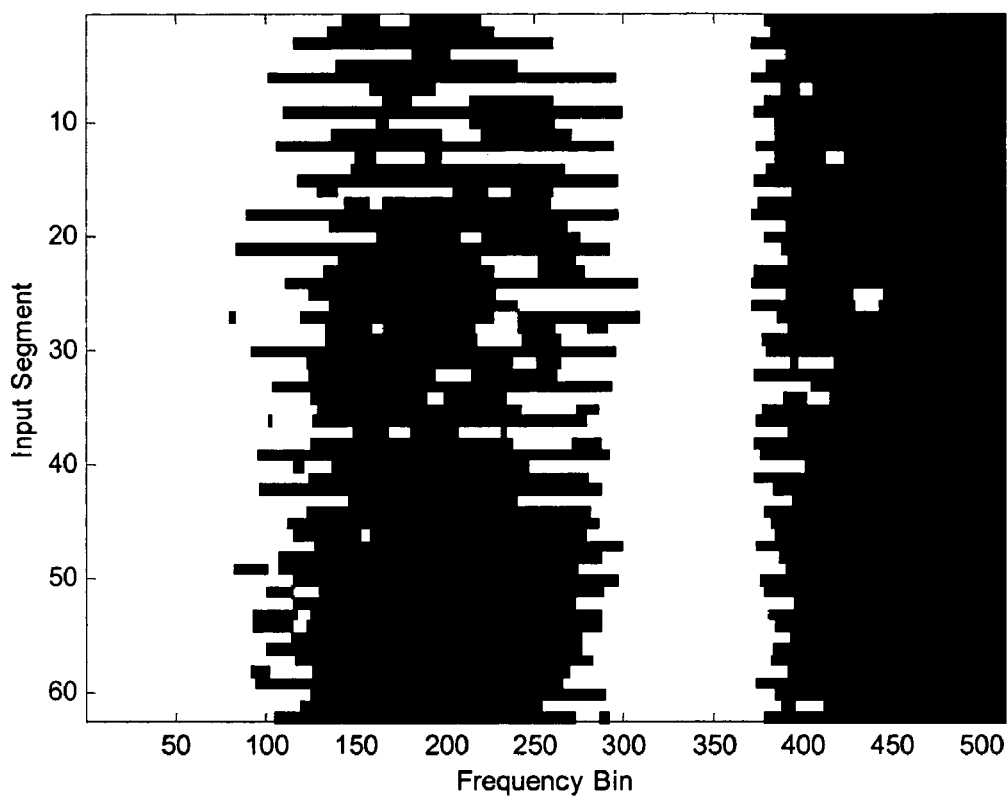
Figure 5(b). Stage 1 detections, a partial fileprint of file lenalsbmod.bmp
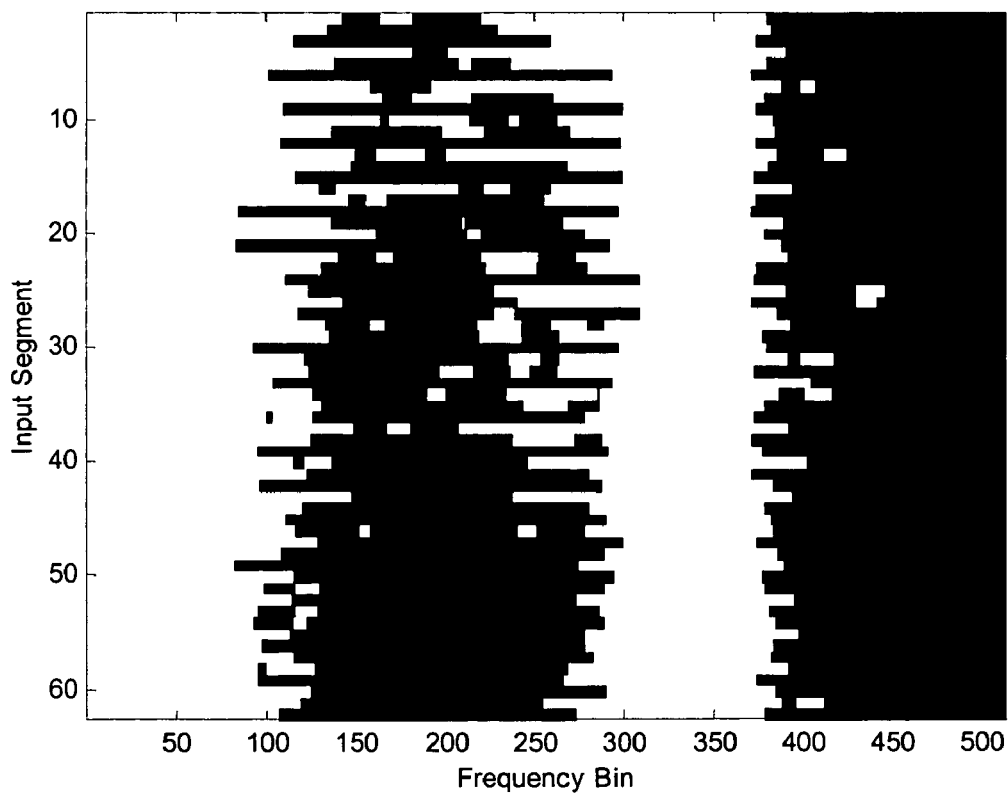

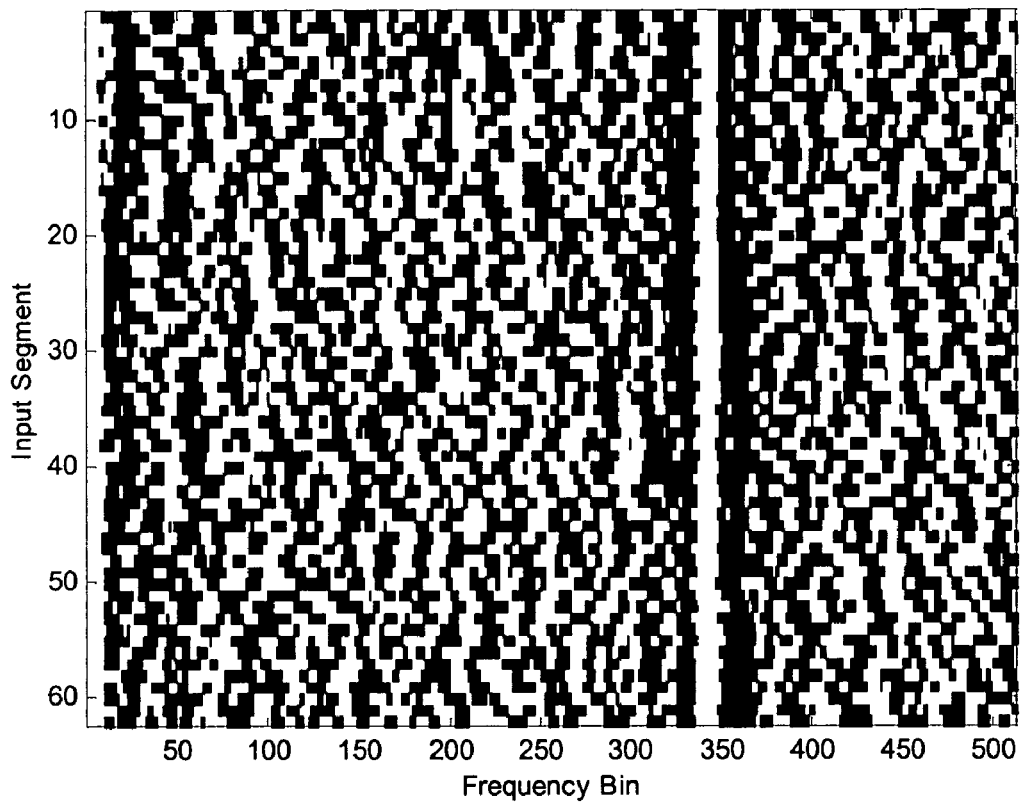
Figure 5(c). Stage 2 detections, a partial fileprint of file lena.bmp
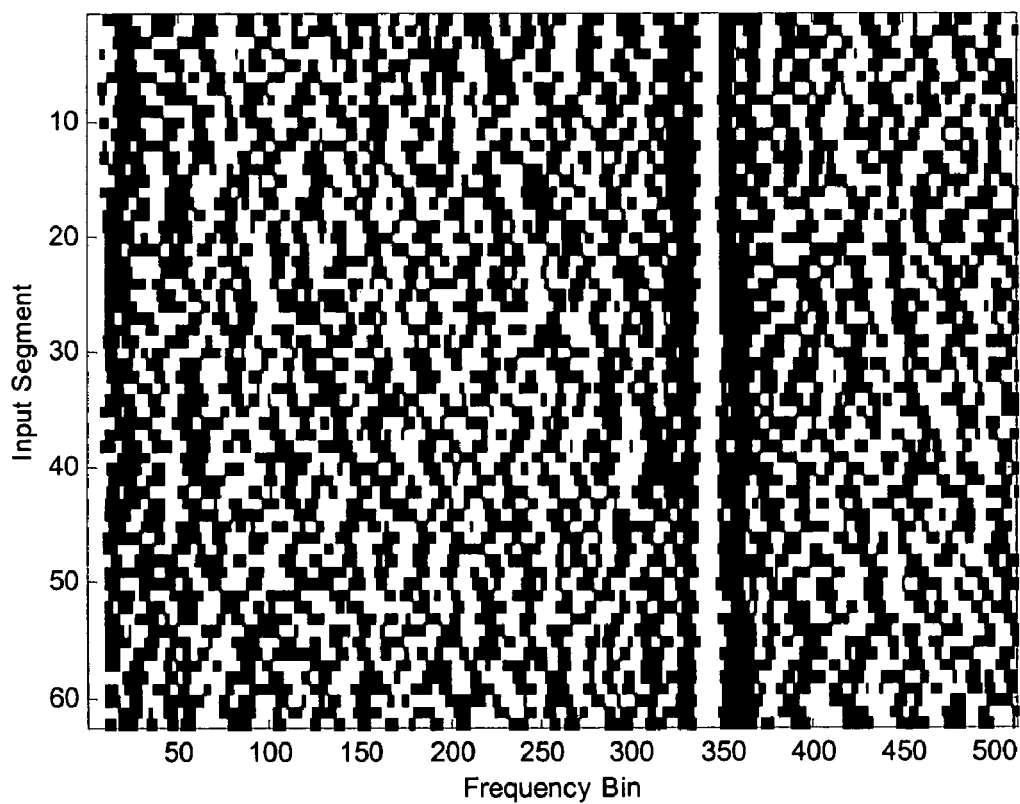
Figure 5(d). Stage 2 detections, a partial fileprint of file lenalsbmod.bmp

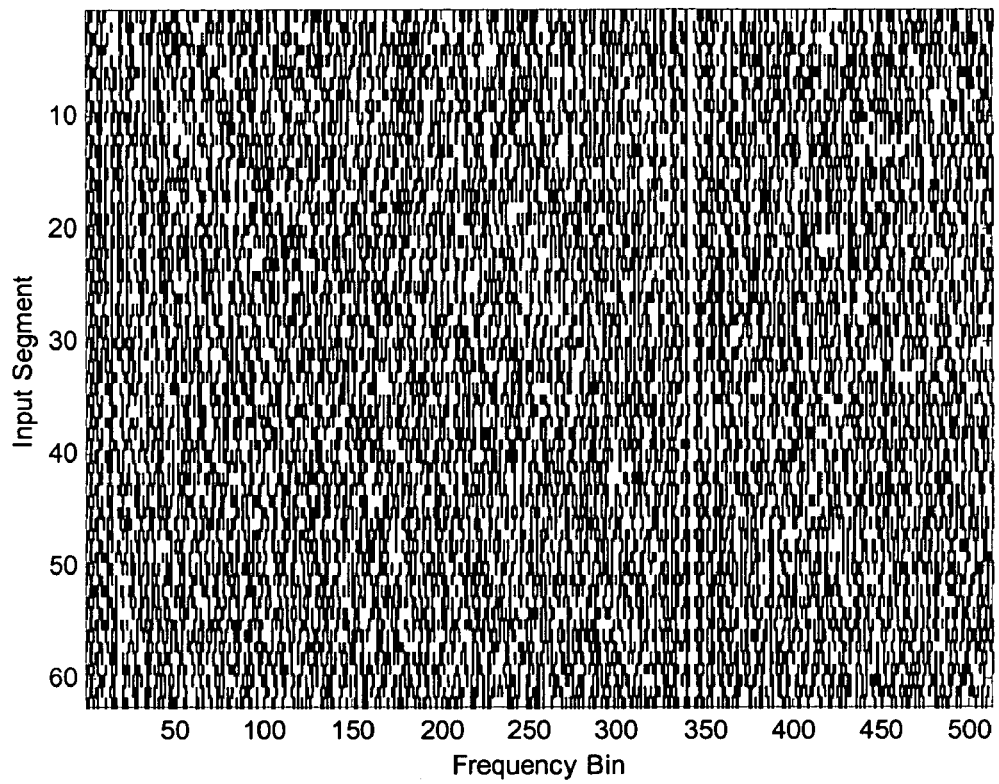
Figure 5(e). Stage 3 detections, a partial fileprint of file lena.bmp
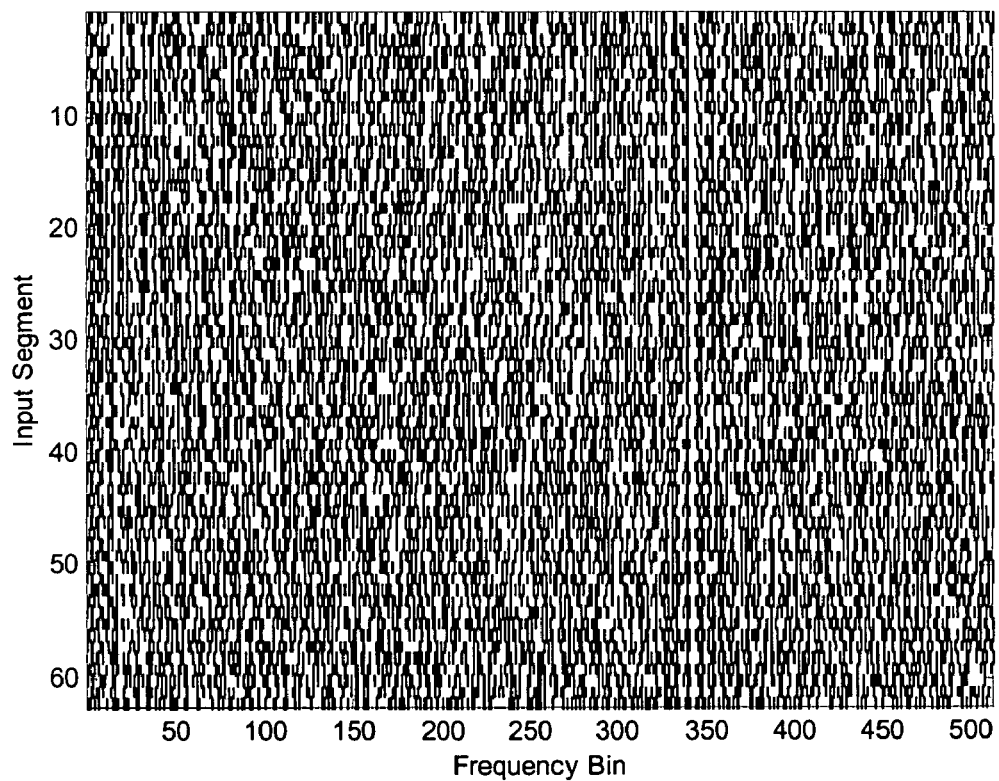
Figure 5(f). Stage 3 detections, a partial fileprint of file lenalsbmod.bmp

METHOD AND APPARATUS FOR DETECTING AND EXTRACTING FILEPRINTS

STATEMENT OF GOVERNMENT INTEREST

The invention described herein may be manufactured and used by or for the Government for governmental purposes without the payment of any royalty thereon.

BACKGROUND OF THE INVENTION

Methods exist for processing an original data sequence in order to generate information about the data for the purposes of integrity measurement, ownership demonstration and authentication. The first category is digital watermarking, the second is data hashing and the third is error detection coding. In the present context, watermarking is often used for ownership demonstration and authentication purposes; data hashing is often used for integrity measurement purposes; and as with data hashing, error detection coding is used to measure data integrity. However, the latter is normally done as part of data transmission protocol and therefore addresses transmission errors rather than tampering.

An important step in data authentication and demonstrating data ownership is some form of registration process. This is a process that is recognized and accepted by the community of users whereby information regarding the original data is stored and later presented for comparisons. It is often important that this information is also time-stamped, properly associated with the original data and stored in a secure fashion. This identifying information regarding the original data can be referred to as registration data. In the exemplifying case of digital watermarking, the watermark, the watermark embedding method and the watermark recovery method can become part of the registration data.

Digital Watermarking

For a more in-depth review of digital watermarking, the reader is referred to [1] and [2]. Digital watermarking is the process of embedding identification data within host data typically for authentication of the host data, and for demonstrating ownership of the host data. Other applications exist and are given in the cited reference. Often, the goal is to embed the identification data in such a manner that changes are imperceptible to a human observer, when the observer only has access to the resulting watermarked data. The identification data or watermark is presumably a small amount of data relative to the host data, making the task of hiding the watermark less difficult. For example, small changes to a group of adjacent pixels in an image can be made in an imperceptible fashion when knowledge of the human ability to detect differences in color and or intensity are taken into account. Likewise, audio data can host imperceptible changes by applying an understanding of the human auditory response. Thus to a human, the watermarked audio data can sound exactly like the original, but in fact be slightly different.

When the goal is to embed watermarks in an imperceptible fashion, there is a trade-off that exists between imperceptibility and robustness to attack. Basically, as more changes are made to the host data as a result of embedding the watermark, better protection can be obtained. Consequently, it becomes less likely that the resulting watermarked data can be altered by an attacker in a manner such that the watermark is essentially removed and the post-attack watermarked data is still useful. However, as more data is embedded, a point is reached where the watermarked data is perceptibly different from the host data. A balance must be obtained such that a margin of robustness to attack and watermarked data quality is maintained.

There are two major disadvantages to digital watermarking. The first is with regard to the fact that a process is required for embedding the watermark within the host data. This process will take time and will require computational resources. The second disadvantage is with regard to the fact that embedding a digital watermark within the host data will result in an alteration of the host data. This is undesirable when the host data is, for example, a digital image or a digital audio recording. In such cases, the watermarking can adversely affect image and audio quality. Even when a human cannot perceive the changes caused by watermarking, the resulting changes may reduce the value of the data.

Data Hash

A data hash is typically used for determining if one or more bits within a data sequence have changed. More recently, hashing has been proposed as an alternative to digital watermarking, when the interest is to provide a method of ownership demonstration and authentication [3]. As the term implies, a data hash is a repeatable process by which the original data is reorganized and reduced to a short sequence for protection purposes. This short output data sequence has been referred to as a fingerprint, a message digest, a hash value or simply a hash of the input data sequence. As with human fingerprints and humans, a hash value is claimed to be with high probability unique to a given input data sequence. In contrast to digital watermarking, it is not necessary for a data hash to embed auxiliary data within the original host data sequence.

Given only the hash value and hash process, it would require a search and hash procedure over an available set of data sequences to determine if the hash value came from a particular sequence. This would make it impractical for an attacker to obtain the original sequence based only on knowledge of the hash value and hash process. Alternatively, a hash value, hash process and input data sequence can be made public. This can help assure the recipients of distributed data sequences that the data is authentic and integrity has been maintained. As an example, after downloading a file over a network, the recipient can first run the hash process on the file to generate the hash value. If this hash value matches the known hash value, then the file can be considered free of unauthorized alterations.

Referring to FIG. 1, a generic description of a prior art data hash process is shown. Pre-processor 101 and Post-processor 103 are optional steps. Processes for Pre-processor 101 can include transformation into an alternate representation domain, data padding and statistical calculations. These operate on the Input Data Sequence which is to be protected. For example, a data hash process may transform data sequences from the time domain to the frequency domain. Some hashes require the appending of known data such as a sequence of zeros in order to establish sequences of specific size. Post-processor 103 can include encoding and compression. These steps operate on the output of Hasher 102 and are often necessary in practical applications. The Output Data Sequence from Post-processor 103 is a representation of the hash of the Input Data Sequence. In most hash processes, the hash value is represented in the Output Data Sequence as a fixed length alphanumeric using hexadecimal notation.

Hasher 102 operates on the output sequence from Pre-processor 101, in such a manner as to reduce the data to an essentially unique hash value. For example, a hash process may generate a 128-bit hash value for each Input Data Sequence. This will allow for $2^{128}$ hash values and potentially as many unique Input Data Sequences.

Secure Key 104 contains the parameters necessary for the operation of Pre-processor 101, Hasher 102, and Post-processor 103. Pre-process parameters may include values for data segmentation, indexing and transformation to other representation domains. Post-processing parameters may include control information for encoding or compression processes. Subsets of the various parameters can include seed values for the generation of pseudo-random number sequences. The use of pseudo-random sequences contributes to the security of the overall hash process.

An advantage that data hashing has over digital watermarking is that no embedding process is required. This preserves the quality of the original input data sequence and is particularly important for digital images and digital audio. However, the typical data hash process has the disadvantage that even though unauthorized alterations of one or more bits will likely be detected, the resulting hash value yields no information about the nature of the alterations. Information is not obtained such as how many bit alterations have taken place, where such changes have occurred within the data sequence and how similar the altered data is to the original data. This is information that would be necessary for ownership demonstration and authentication. Newly proposed hash methods have begun to address these disadvantages for the case of image data using a wavelet decomposition [3]. Hash methods that address these disadvantages and are more generally applicable to a variety of data sequences are required.

Error Detection Coding

Error detection coding is a mature technology area within the field of digital communications and data transmission. As with data hashing, the purpose of error detection coding is to measure data integrity. Unlike data hashing, the coding can be designed to allow for the further purpose of error correction. Error detection coding is normally done as part of data transmission protocol and addresses transmission errors rather than tampering. These transmission errors occur as a result of additive noise and other distortions present in the transmission channel. Reference is made to [4] for details regarding coding for the purpose of detecting transmission errors in received data sequences. Some background is provided here for contextual purposes in relation to the subject invention.

In error detection coding, data sequences to be transmitted are mapped to new data sequences prior to transmission. The mapping results in a substantial increase in the size of the transmitted data sequence. Error detection capability is achieved at the expense of this increase in size. For example, some error coding techniques operate on blocks or segments of consecutive bits that comprise the entire data sequence. In this case, each segment of sequential bits of information is mapped to what is referred to as a code word. The mapping is done in such a way that each code word contains more bits than the corresponding information segment. Each code word is also a sequence of bits that uniquely corresponds to one of the possible information segments. However, because the code words consist of more bits, a designer can choose code words that are more easily separated at the receiver. Once received, the code words are simply mapped back to the original information segment. Without the error coding, the shorter length information segments are more difficult to distinguish between at the receiver, potentially causing transmission errors.

Error detection coding has some advantages over most data hash and watermarking processes. Although not all errors are detected, the coding often helps to identify segments of the data sequence that contain errors. Rather than re-transmitting the entire data sequence, this allows for re-transmission requests for only the affected segment. Also, with error detection coding, errors can often be corrected with no need for re-transmission. A disadvantage of error detection coding is the increase in size of the transmitted data sequence. This leads to an increase in the transmission rate, and therefore requires additional bandwidth or power resources. It is not uncommon for error detection coding schemes to result in a doubling of the data sequence size. A further disadvantage of error detection coding is that the purposes of ownership demonstration and authentication are not achieved. For example, unauthorized alterations made prior to transmission will result in a modified data sequence that is treated by the error coding process as any other input. Thus the coding process will attempt to faithfully transmit the modified data sequence.

REFERENCES

[1] C. I. Podilchuk, E. J. Delp, "Digital Watermarking: Algorithms and Applications" *IEEE Signal Processing Magazine*, Vol. 18, No. 4, July 2001 pp. 33–46.

[2] I. J. Cox, M. L. Miller, "The First 50 Years of Electronic Watermarking," *EURASIP Journal on Applied Signal Processing* 2002:2, pp. 126–132.

[3] R. Venkatesan, S.-M. Koon, M. H. Jakubowski, P. Moulin, "Robust Image Hashing," 2000 IEEE International Conference on Image Processing, ICIP00.

[4] J. G. Proakis, *Digital Communications, $2^{nd}$* Ed., McGraw-Hill Inc., 1989.

OBJECTS AND SUMMARY OF THE INVENTION

One object of the present invention is to provide a customizable, efficient. and effective method and apparatus for measuring the integrity of a data sequence of interest. Integrity is lost when bit changes occur within the data sequence. Changes are typically due to transmission errors or due to tampering.

Another object of the present invention is to provide a method and apparatus for measuring the integrity of a data sequence of interest that includes a provision for assessing the extent and general location of the changes within the data. Of particular interest are data sequences that are of substantial size, for example, on the order of 10,000 bytes or more. Although it is sometimes possible to make comparisons to a protected duplicate for integrity measurement, it becomes impractical and difficult to make comparisons when the data sequence size and the number of data sequences are substantial.

Yet another object of the present invention is to provide a method and apparatus for measuring similarity between data sequences. Similarity measurement can be used for demonstrating ownership of data. In this context, in addition to an ability to measure integrity, what is desired is an ability to conclude whether or not the data of interest has been derived through alteration of previously existing data. This can also allow for data authentication, which is the determination of the origins of the data.

Still another object of the present invention is to provide a method and apparatus for automatically identifying the data type. For example, when packets of data are available prior to knowledge of the source, determining the data type can be useful for sorting. In the case of data files, this can be an ability to determine the filename extension (such as .bmp or .wav), without prior knowledge of the filename.

The invention described herein provides a method and apparatus for processing data sequences for the purpose of data integrity assessment, data ownership demonstration and data authentication. The present invention processes an input data sequence to extract what could be called naturally occurring digital watermarks. More appropriately, these naturally occurring digital watermarks are referred to herein as fileprints. Fileprints are data sequences that have been extracted from the input data sequence in a repeatable manner, and are with high probability unique to that input. In this sense, a fileprint can be used to identify which data sequence it came from, just as a human fingerprint can identify a particular person to which it belongs. Because the fileprints have not been embedded, they are not actually digital watermarks. However, fileprints can be used in a like fashion to digital watermarks for information protection.

According to an embodiment of the present invention, method for detecting and extracting fileprints, comprises the steps of inputting a data sequence; obtaining parsing parameters from a secure key; partitioning the data sequence into segments using the parsing parameters; estimating the power spectral density of the segments, wherein each segment comprises N-samples; ABC-processing each of the segments using ABC-parameters; generating fileprints by threshold-detection-comparing the ABC-processed segments to thresholds from a secure key; compressing and encoding the fileprints so as to reduce their size; and outputting the compressed and encoded fileprints.

According to another embodiment of the present invention, method for storing files using a detector and extractor of fileprints (DEF), comprises the steps of compressing and encoding an input data file; a first step of selecting whether the input data file or the compressed and encoded input data file is sent to a router for storage; sending the selected file to a router for storage; a second step of selecting whether fileprints will be extracted from either the input data file or the compressed and encoded input data file; a first step of storing on a first storage/system network: the status/outcome of the first step of selecting; the fileprints; the DEF parameters, and input data file identification; and a second step of storing on a second storage/system network: the status/outcome of the second step of selecting; the version of the file from a router, and input data file identification.

According to yet another embodiment of the present invention, method for retrieving stored files using a detector and extractor of fileprints (DEF), comprises the steps of: requesting a retrieval by identifying the stored file; a first step of retrieving from the storage/system network the stored file and the status/outcome of the first step of selecting; decompressing and decoding the retrieved said stored file; a second step of retrieving from the storage/system network: the status/outcome of the second step of selecting; the fileprints of the stored file, and the DEF parameters associated with the stored file; directing said DEF parameters to the DEF; a first step of directing the status/outcome of the second step of selecting so as to determine whether the step of decompressing and decoding will output either a decompressed/decoded version of the stored file as stored to the DEF or an original version of the stored file as stored to the DEF; a second step of directing the status/outcome of the first step of selecting so as to determine whether the step of decompressing and decoding will output either a decompressed/decoded version of the stored file or an original version of the stored file; verifying the either decompressed/decoded version of the stored file or an original version of the stored file; extracting new fileprints from the stored file; comparing the new fileprints to the retrieved fileprints of the stored file, wherein similarity measurements are made; performing a storage-retrieval-registration-and verification-approver process on the similarity measurements; and outputting the data file if appropriate similarity measurements have been made.

According to a feature of both embodiments of the present invention, method for storing and retrieving files using a detector and extractor of fileprints (DEF), further comprises a step of ABC-processing each of the segments; wherein the ABC-processing further comprises the steps of: first-stage filtering for averaging over frequency using a symmetric unity-gain filter employing a Hanning window with 41 coefficients; and second-stage filtering for averaging over frequency using a symmetric unity-gain FIR filter employing a Hanning window with 11 coefficients and circular convolution.

Advantages and New Features

There are several advantages attributable to the Detector and Extractor of Fileprints (DEF) relative to prior art methods of data protection. An important advantage is the fact that no auxiliary data is embedded into the host data to be protected. This eliminates the processing time and computational resources normally required to embed the auxiliary data. Furthermore, the process of embedding auxiliary data will alter the original host data. The alteration of host data, particularly image and audio data, degrades the value of the host data. Because no auxiliary data is embedded into the host data by the DEF process, no degradation occurs.

A related advantage stems from the fact that the fileprints extracted from the original data are unique to the data. Therefore, the registration information need not include the original data. In cases where the data is considered proprietary and/or of high value, non-disclosure of the data can be an important issue.

Another advantage is the fact that unauthorized changes detected by the DEF are associated with the segment in which the changes occurred. This allows for locating such changes and contributes to making decisions regarding the corrective course of action to be taken.

Still another advantage is the fact that the transformation to the frequency domain within the DEF produces measures of periodic components of the data. Format information associated with data transmission and storage can result in frequency domain representations that are unique. Audio and image data also produce highly informative frequency domain representations. As a result, the fileprints extracted using the DEF process retain important characteristics that can be associated with data types. This allows for the characterization and identification of data sequences when a-priori knowledge is limited.

Yet another advantage attributable to the DEF is the fact that parameters-can be chosen to suit the requirements of the application. Important aspects such as input data parsing, frequency resolution and fileprint size can be controlled.

Still yet another advantage is achieved by using the DEF in generating fileprints. The fileprints that are produced by the DEF process can be used to create binary images as presented in the examples of FIG. 4A through FIG. 4F and FIG. 5A through FIG. 5F. This allows for human visual inspection of the fileprints. The presentation and inspection of fileprints by humans can be useful in proceedings where evidence is required regarding data ownership and authenticity.

BRIEF DESCRIPTION OF THE DRAWINGS

FIG. 4A and FIG. 4B depicts DEF stage 1 fileprints of audio files.

FIG. 4C and FIG. 4D depicts DEF stage 2 fileprints of audio files.

FIG. 4E and FIG. 4F depicts DEF stage 3 fileprints of audio files.

FIG. 5A and FIG. 5B depicts DEF stage 1 fileprints of image files.

FIG. 5C and FIG. 5D depicts DEF stage 2 fileprints of image files.

FIG. 5E and FIG. 5F depicts DEF stage 3 fileprints of image files.

DETAILED DESCRIPTION OF THE PREFERRED EMBODIMENT

Figure 1:
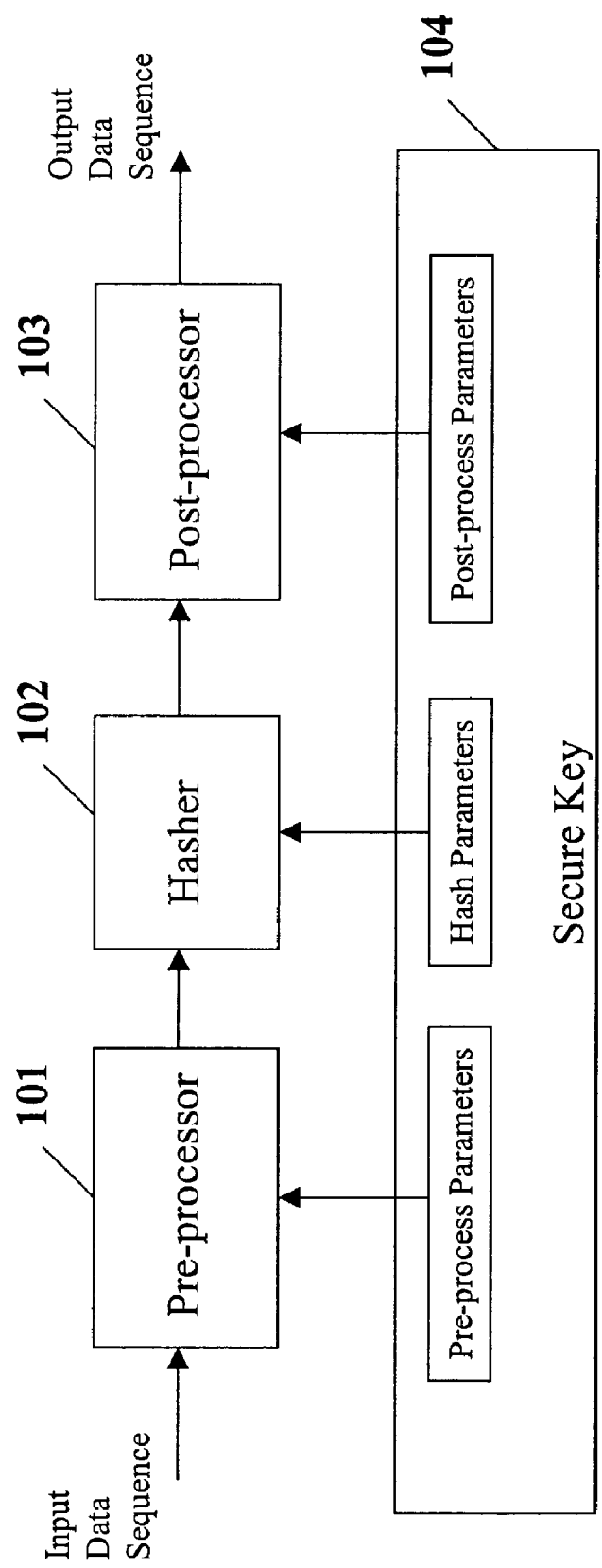
FIG. 1 depicts a prior art data hash process.
Figure 2:
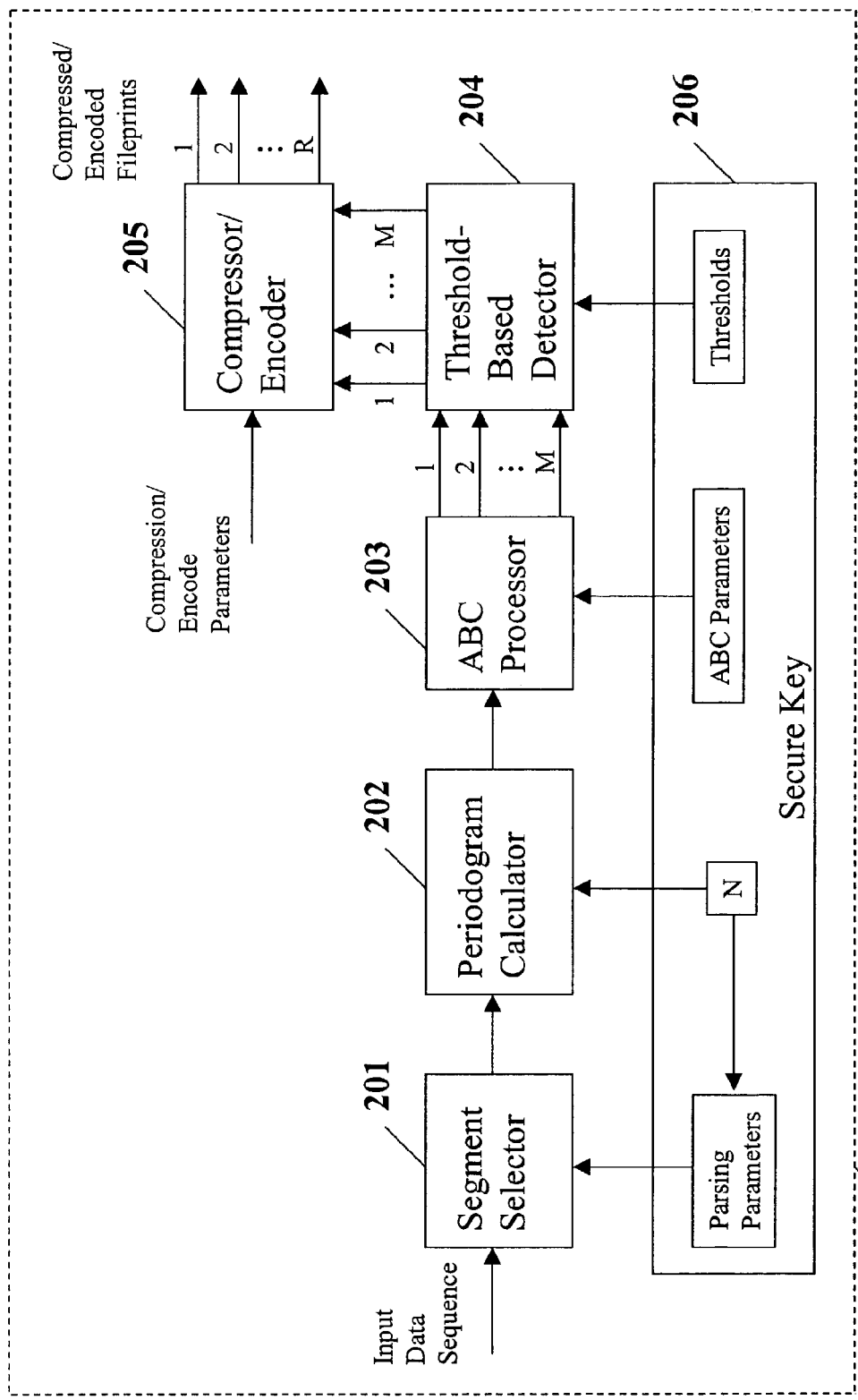
FIG. 2 depicts the detector and extractor of fileprints (DEF) of the present invention.

Referring to FIG. 2, a block diagram of the Detector and Extractor of Fileprints (DEF) 200 is shown. The DEF 200 accepts an Input Data Sequence for processing by Segment Selector 201. Based on parsing parameters from Secure Key 206, the Input Data Sequence is partitioned by Segment Selector 201 into a set of segments with L-samples per segment. Here, a sample is a sequence of bits that can be interpreted as a number. Each segment of the set is processed in turn by Periodogram Calculator 202, which generates an estimate of the power spectral density of each segment. For a given input segment, the output of Periodogram Calculator 202 will be an N-sample segment, where N is no larger than L. Log-scaled estimates are particularly effective, as when the discrete-Fourier-transform of the data is used and the log-magnitude of the transform is retained. Each resulting segment is input to ABC Processor 203. Detail regarding the processing steps of ABC Processor 203 can be found in U.S. Pat. No. 5,257,211, incorporated herein by reference. According to U.S. Pat. No. 5,257,211, the adjustable bandwidth concept implemented by the ABC Processor is based on an N-point windowed FFT unit which is used to form the periodogram which is used as the power spectral estimate. The adjustable bandwidth concept implemented by the ABC Processor processes seciuential sets of N-point power spectral estimates where N is constrained by the FFT algorithm to be a power of 2 (e.g., 512, 1024, etc.) ABC parameters such as the number of stages, M, are obtained from Secure Key 206. M fileprints are generated by Threshold-Based Detector 204. This is accomplished by comparing the ABC Processor 203 outputs to thresholds from Secure Key 206. Thus if the parsing of the Input Data Sequence results in a set containing S segments, each fileprint associated with the input will be a binary array of size S rows by N columns. For efficient storage, retrieval, transmission and utilization, the fileprints can be reduced in size by Compressor/Encoder 205 such that representations for R of the M fileprints are available. The parameters for Compressor/Encoder 205 can optionally be stored in Secure Key 206, or stored separately as shown in the figure. The output of Compressor/Encoder 205 is a set of R compressed and/or encoded fileprints, where R is no larger than M.

Due to the user-selectable parameters of Secure Key 206 along with the compression/encode parameters, the present invention allows for a highly customizable method of generating fileprints. In addition, the parameters of Secure Key 206 are retained in a method appropriate for a desired level of secrecy regarding how the fileprints have been generated. The typical parameter selection process will begin with the choice of the integer, N. Selecting N to be a fixed value and a power of 2 will allow for simplified processing in Periodogram Calculator 202 using the popular fast-Fourier transform (FFT). Once N is selected, parsing parameters can be chosen. The parsing parameters for Segment Selector 201 determine how the S subsets of data are formed from the Input Data Sequence. This includes how to interpret the Input Data Sequence as a sequence of samples. For example, the Input Data Sequence can be interpreted as a sequence of 8-bit unsigned integer-valued samples. This can help increase sensitivity to unauthorized changes, relative to the choice of greater than 8 bits per sample. Note that in the case where the Input Data Sequence represents samples such as audio amplitudes or image pixel colors, Segment Selector 201 is not constrained to the same interpretation of samples. Another function of Segment Selector 201 is to produce the L-sample segments from specified starting locations within the Input Data Sequence. This allows for the selection of segments with overlapping sample boundaries. These starting locations are among the parsing parameters.

The remaining parameters to be chosen by the user are the ABC and threshold parameters. The ABC process allows for an M-stage approach to averaging over frequency and over time. By considering the output of Periodogram Calculator 202 to be time-consecutive segments, the ABC parameters can be chosen accordingly. Although a large range of thresholds will give useful results from Threshold-Based Detector 204, fileprint characteristics are directly affected by the choice of thresholds. The preferred mode of operation is obtained when each of the binary fileprint arrays contains a 1 in approximately 50 percent of the elements of the arrays. The number of elements in a fileprint is the product of S and N. To achieve this characteristic for fileprint 2 through M, threshold values close to zero can be chosen. To achieve this characteristic for fileprint 1, statistics of the samples from stage 1 of ABC Processor 203 can be used to set the threshold for stage 1. Regardless of the manner in which the thresholds are chosen, these and all other parameters must be stored to allow for the ability to reliably reproduce the fileprints.

Preferred Embodiment of the Present Invention

Figure 3A:
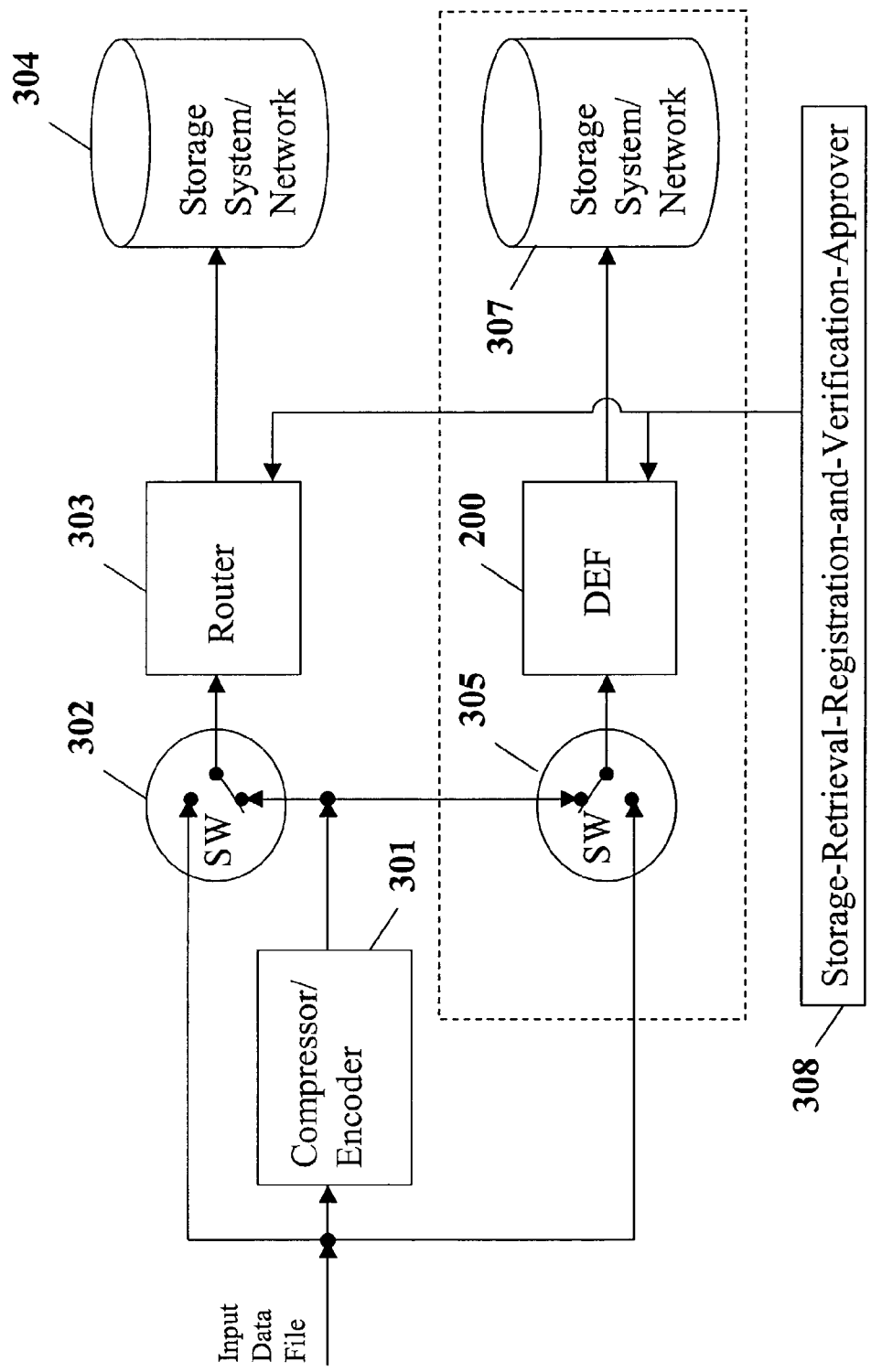
FIG. 3A depicts a file storage application of the DEF of the present invention.
Figure 3B:
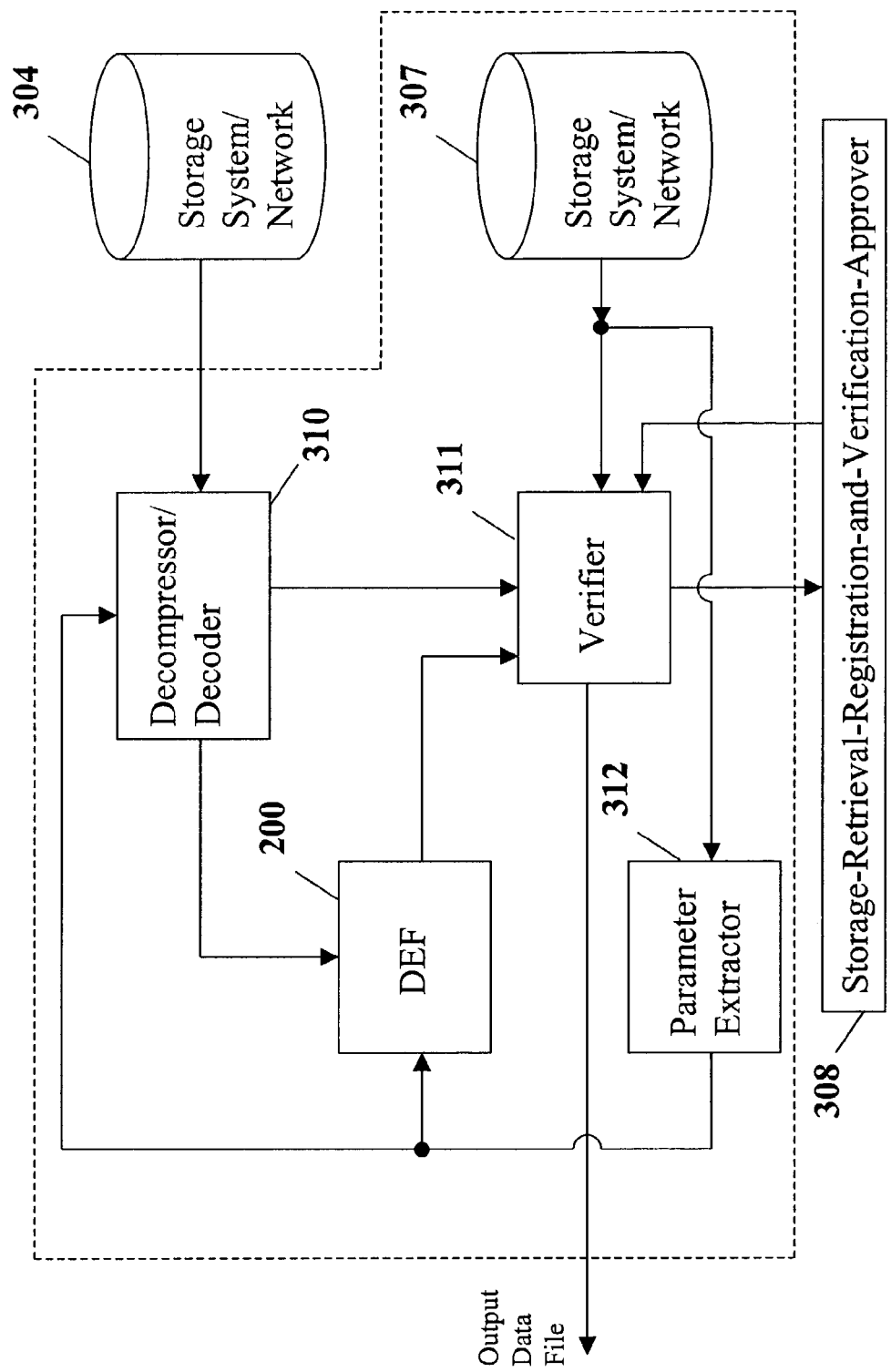
FIG. 3B depicts a file retrieval application of the DEF of the present invention.

A preferred embodiment of the present invention is shown in FIGS. 3A and 3B. An Input Data File is to be stored on Storage System/Network 304 as shown in FIG. 3A. At the same time, fileprints extracted from the Input Data File using Detector and Extractor of Fileprints (DEF) 200 (see FIG. 2) are stored on Storage System/Network 307. For this example, the original Input Data File is processed by Compressor/Encoder 301 to make available a compressed/encoded version of the file. A switch, SW 302, determines whether or not the Input Data File or the compressed/encoded version is sent to Router 303 for potential storage. In this example, lossless compression is assumed. Likewise a switch SW 305 determines whether fileprints will be extracted from the Input Data File or the compressed/ encoded version. Under control of Storage-Retrieval-Registration-and-Verification-Approver 308, the status of SW 305, the fileprints, DEF parameters and Input Data File identification such as name and date are stored on Storage System/Network 307. Likewise, under control of Storage-Retrieval-Registration-and-Verification-Approver 308, the status of SW 302, the version of the file from Router 303 and Input Data File identification such as name and date are stored on Storage System/Network 304. The dashed lines around SW 305, DEF 200 and Storage System/Network 307 are used to imply a higher level of security for these devices and data paths.

Referring now to FIG. 3B, file retrieval is depicted. To retrieve an Input Data File previously stored by the system (see FIG. 3A), a request for retrieval is made by providing some identification aspect of the file such as file name. The file and status of SW 302 (see FIG. 3A) are retrieved from Storage System/Network 304 and made available to Decompressor/Decoder 310. At the same time, the status of SW 305 (see FIG. 3A), the fileprints, and DEF parameters associated with the file are retrieved from Storage System/Network 307. Parameter Extractor 312 directs the retrieved DEF parameters to DEF 200 and the retrieved status of SW 305 (see FIG. 3A) to Decompressor/Decoder 310. Based on the status of SW 305 (see FIG. 3A), Decompressor/Decoder 310 will output either the compressed/decoded version of the stored file, or the original stored file to DEF 200 (see FIG. 2). Likewise, based on the status of SW 302 (see FIG. 3A), Decompressor/Decoder 310 will output either the compressed/decoded version of the file, or the original file to Verifier 311. Verifier 311 also receives from DEF 200 the extracted fileprints from the stored file. With these newly generated fileprints which have been extracted, Verifier 311 compares these to the fileprints retrieved from Storage System/Network 307. Similarity measurements made by Verifier 311 during the compare process are sent to Storage-Retrieval-Registration-and-Verification-Approver 308, which then directs Verifier 311 to provide the Output Data File, if appropriate similarity measurements have been obtained. The dashed lines around Decompressor/Decoder 310, DEF 200, Verifier 311, Parameter Extractor 312 and Storage System/Network 307 are used to imply a higher level of security for these devices and data paths.

This example serves to demonstrate how the DEF 200 can be used for the purposes of data integrity measurement and similarity measurement. A scenario that can develop is one where Storage System/Network 304 is useful for the sharing of data and/or capable of large volumes of storage. However, due to the public nature of this network, the data is vulnerable to unauthorized changes, incorrect claims to ownership, unclear authenticity, or any combination of these and related problems. Through the policies and policing actions of Storage-Retrieval-Registration-and-Verification-Approver 308, the depicted process of fileprint utilization can detect changes and clarify ownership and authentication issues. Thus it is implied that Storage-Retrieval-Registration-and-Verification-Approver 308 is maintained at a security level that is equal to or higher than any given security level within the example.

FILEPRINT EXAMPLES

The applicability of the DEF 200 to the purpose of automatic identification of data type can be shown by providing examples of fileprints from actual data files. The fileprints have been extracted using an experimental DEF implementation. These example fileprints demonstrate the fact that files of differing types, audio files with .wav extensions and image files with .bmp extensions, exhibit patterns in the fileprints which can be used to automatically identify the type of data file. The ability to measure similarity is also made apparent.

Referring now to FIG. 4A, FIG. 4B, FIG. 4C, FIG. 4D, FIG. 4E, and FIG. 4F, fileprints were extracted from a pair of audio files, faks0_sa1.wav and faks0_sa1lsbmod.wav, and are shown. An ABC Processor with 3 stages was used in the DEF 200. The first stage filter for averaging over frequency was a symmetric unity-gain FIR filter, designed using a Hanning window and 41 coefficients. The second stage filter for averaging over frequency was a symmetric unity-gain FIR filter, designed using a Hanning window and 11 coefficients. Circular convolution was employed, and no averaging over time was used in the stages. The first stage threshold was set to an estimate of the average noise power from the Periodogram Calculator, and is constant for the entire file. The second and third stage thresholds were each set to zero for the entire file. The parameter N was chosen to be 1024 and 8-bit samples were used. Segments consisted of N consecutive samples read from the file, with no overlap. All samples contained in each of the files were used.

To simulate unauthorized changes to the data file, the audio file faks0_sa1.wav was used to generate the same sized audio file, faks0_sa1lsbmod.wav, by setting all least-significant bits of the 16-bit audio samples to zero. The original audio file, faks0_sa1.wav is from the commonly used TIMIT database. Visual inspection of FIG. 4A and FIG. 4B shows that the fileprints from stage 1 have strong similarity between the original and altered files. A more careful visual inspection of these figures also reveals slight differences appearing randomly within the fileprints. Such differences can be seen, for example, at the detection results near the locations (frequency bin 410, input segment 19) or (frequency bin 70, input segment 45). In a similar fashion, FIG. 4C and FIG. 4D show similarities and differences between the stage 2 fileprints of both audio files. Likewise, FIG. 4E and FIG. 4F show similarities and differences between the stage 3 fileprints of both audio files. As stage number increases, the differences between the compared fileprints tend to also increase. Therefore, a general trend is that stage 1 fileprints are more useful for presenting similarities, while stages 2 and 3 are more useful for presenting differences between the audio files.

Referring now to FIG. 5A, FIG. 5B, FIG. 5C, FIG. 5D, FIG. 5E, and FIG. 5F, image file examples are shown. Fileprints were extracted from a pair of image files, lena.bmp and lenalsbmod.bmp, and the first 62 input segments are shown in FIG. 5A, through FIG. 5F. An ABC Processor with 3 stages was used in the DEF process. The first stage filter for averaging over frequency was a symmetric unity-gain FIR filter, designed using a Hanning window and 41 coefficients. The second stage filter for averaging over frequency was a symmetric unity-gain FIR filter, designed using a Harming window and 11 coefficients. Circular convolution was employed, and no averaging over time was used in the stages. The first stage threshold was set to an estimate of the average noise power from the Periodogram Calculator, and is constant for the entire file. The second and third stage thresholds were each set to zero for the entire file. The parameter N was chosen to be 1024 and 8-bit samples were used. Segments consisted of N consecutive samples read from the file, with no overlap. All samples contained in each of the files were used to generate the fileprints, however, only the first 62 input segments are shown to allow visual comparisons to be made to the audio examples of FIG. 4A, through FIG. 4F.

To simulate unauthorized changes to the data file, the image file lena.bmp was used to generate the same sized image file, lenalsbmod.bmp, by setting to zero all least-significant bits of the 8-bit RGB components of samples. The original image file, lena.bmp is the commonly used Lena image. Visual inspection of FIG. 5A and FIG. 5B shows that the fileprints from stage 1 have strong similarity between the original and altered files. A more careful visual inspection of these figures also reveals slight differences appearing randomly within the fileprints. Such differences can be seen, for example, at the detection results near the locations (frequency bin 220, input segment 20) or (frequency bin 80, input segment 27). In a similar fashion, FIG. 5C, and FIG. 5D show similarities and differences between the stage 2 fileprints of both image files. Likewise, FIG. 5E, and FIG. 5F show similarities and differences between the stage 3 fileprints of both image files. As stage number increases, the differences between the compared fileprints tend to also increase. Therefore, a general trend is that stage 1 fileprints are more useful for presenting similarities, while stages 2 and 3 are more useful for presenting differences between the image files.

Note also that visual comparisons of the fileprints shown in the audio examples of FIG. 4A, through FIG. 4F to the fileprints shown in the image examples of FIG. 5A, through FIG. 5F, allow for the observances of characteristics of the file types. In particular, note the increase in structure for the .bmp image fileprints near frequency bin 350. Observation of fileprints extracted from additional .wav, .bmp and other file types have confirmed the consistency of characteristics unique to the file type.

While the preferred embodiments have been described and illustrated, it should be understood that various substitutions, equivalents, adaptations and modifications of the invention may be made thereto by those skilled in the art without departing from the spirit and scope of the invention. Accordingly, it is to be understood that the present invention has been described by way of illustration and not limitation.

What is claimed is:

1. Method for detecting and extracting fileprints, comprising the steps of:
    inputting a data sequence;
    obtaining parsing parameters from a secure key and selecting parameters for said secure key, wherein said selecting parameters is initiated by the selection of an integer N, said integer N being both a fixed value and a power of 2;
    partitioning said data sequence into segments using said parsing parameters;
    estimating a power spectral density of said segments, wherein each said segment comprises N-samples;
    ABC-processing each of said segments using ABC-parameters;
    generating fileprints by threshold-detection-comparing said ABC-processed segments to thresholds from said secure key;
    compressing and encoding said fileprints so as to reduce their size; and
    extracting and outputting said compressed and encoded fileprints.

2. Method of claim 1, wherein said step of estimating the power spectral density further comprises the step of performing a fast fourier transform (FFT).

3. Method of claim 1, wherein said step of selecting parameters further comprises selecting parsing, ABC, and threshold parameters.

4. Method for storing and retrieving files using a detector and extractor of fileprints (DEF), comprising the steps of:
    compressing and encoding an input data file;
    a first step of selecting either said input data file or said compressed and encoded input data file to be sent to a router for storage;
    sending said selected file to a router for storage;
    a second step of selecting fileprint extraction from either said input data file or said compressed and encoded input data file;
    a first step of storing on a first storage/system network, comprising:
        storing a status/outcome of said first step of selecting;
        storing said fileprints;
        storing DEF parameters, and input data file identification; and
    a second step of storing on a second storage/system network, comprising:
        storing said status/outcome of said second step of selecting;
        storing a version of said selected file from a router, and storing input data file identification;
    requesting a retrieval by identifying said stored file;
    a first step of retrieving from a first storage/system network said stored file and said status/outcome of said first step of selecting;
    decompressing and decoding said retrieved said stored file;
    a second step of retrieving from said second storage/system network, comprising:
        retrieving said status/outcome of said second step of selecting;
        retrieving said fileprints of said stored file, and
        retrieving said DEF parameters associated with said stored file;
    directing said DEF parameters to said DEF;
    a first step of directing said status/outcome of said second step of selecting so as to determine whether a step of said decompressing and decoding will output either a decompressed/decoded version of said stored file as stored to said DEF or an original version of said stored file as stored to said DEF;
    a second step of directing said status/outcome of said first step of selecting so as to determine whether a step of said decompressing and decoding will output either a decompressed/decoded version of said stored file or an original version of said stored file;
    verifying said either decompressed/decoded version of said stored file or an original version of said stored file;
    detecting and extracting new fileprints from said stored file;
    comparing said new fileprints to said retrieved fileprints of said stored file, wherein similarity measurements are made;
    performing a storage-retrieval-registration-and verification-approver process on said similarity measurements; and
    outputting said data file if appropriate similarity measurements have been made.

5. Method of claim 4, wherein said step of performing a storage-retrieval-registration-and verification-approver process further comprises the steps of detecting changes in, clarifying ownership of, and authenticating said stored file.

6. Method of claims 4 and 5, further comprising a step of ABC-processing each of said segments; wherein said ABC-processing further comprises the steps of:
  first-stage filtering for averaging over frequency using a symmetric unity-gain filter employing a Harming window with 41 coefficients;
  second-stage filtering for averaging over frequency using a symmetric unity-gain FIR filter employing a Hanning window with 11 coefficients and circular convolution;
  thirty stage filtering;
  setting the threshold of said first-stage filtering to the estimate of the average noise power of said segments; and
  setting the threshold of said second-stage and said third-stage filtering to zero.

7. Method of claims 6, wherein said files are audio files.

8. Method of claim 7, further comprising the step of simulating unauthorized changes to a data file by setting all of the least significant bits of the 16-bit audio samples to "zero".

9. Method of claims 6, wherein said files are image files.

10. Method of claim 9, further comprising the step of simulating unauthorized changes to a data file by setting all of the least significant bits of the 8-bit RGB components to "zero".

11. Apparatus for detecting and extracting fileprints (DEF), comprising:
  a secure key for generating DEF parameters to be utilized in subsequent DEF components;
  selecting parameters for said secure key comprising an integer N, said integer N being both a fixed value and a power of 2;
  a segment selector for partitioning a data sequence into segments using parsing parameters generated by said secure key;
  a periodogram calculator for estimating the power spectral density of said segments, wherein each said segment comprises N-samples and an integer N being generated by said secure key;
  an ABC processor for processing each of said segments using ABC parameters, said ABC parameters, including a number of stages M, being generated by said secure key so as to produce an ABC-processed segments;
  a threshold-based detector for generating fileprints by threshold-detection-comparing said ABC-processed segments to thresholds from said secure key;
  a compressor/encoder for compressing and encoding said fileprints so as to reduce their size prior to outputting them and
  means for extracting and outputting said compressed and encoded fileprints.

12. Apparatus as in claim 11, wherein said periodogram calculator further comprises means for performing a fast fourier transform (FFT).

13. Apparatus as in claim 11, wherein said means for selecting further comprises means for selecting parsing, ABC and threshold parameters.

14. Apparatus for storing files using a detector and extractor of fileprints (DEF), comprising:
  a compressor/encoder for compressing and encoding an input data file;
  a first switch for selecting either said input data file or said compressed and encoded input data file to be sent to a router for storage;
  means for sending said selected file to a router for storage;
  a second switch for selecting fileprint extraction from either said input data file or said compressed and encoded input data file;
  a first means for storing on a first storage/system network, comprising:
    storing a status of said first switch for selecting;
    storing said fileprints;
    storing DEF parameters, and
    storing input data file identification; and
  a second means for storing on a second storage/system network, comprising:
    storing said status of said second switch for selecting;
    storing a version of said selected file from a router, and
    storing input data file identification,
  means for requesting a retrieval by identifying a stored file;
  first means for retrieving from said first storage/system network said stored file and said status of said first switch for selecting;
  means for decompressing and decoding a retrieved said stored file;
  a second means for retrieving from said second storage/system network, comprising:
    retrieving said status of said second switch for selecting;
    retrieving said fileprints of said stored file, and
    retrieving said DEF parameters associated with said stored file;
  means for directing said DEF parameters to said DEF;
  a first means for directing said status of said second switch for selecting so as to determine whether a step of said decompressing and decoding will output either a decompressed/decoded version of said stored file as stored to said DEF or an original version of said stored file as stored to said DEF;
  a second means for directing said status of said first switch for selecting so as to determine whether a step of said decompressing and decoding will output either a decompressed/decoded version of said stored file or an original version of said stored file;
  means for verifying either said decompressed/decoded version of said stored file or an original version of said stored file
  means for detecting and extracting new fileprints from said stored file means for comparing said new fileprints to said retrieved fileprints of said stored file, wherein similarity measurements are made;
  means for performing a storage-retrieval-registration-and verification-approver process on said similarity measurements; and
  means for outputting said data file if appropriate similarity measurements have been made.

15. Apparatus as in claim 14, wherein said means for performing a storage-retrieval-registration-and verification-approver process further comprises means for detecting changes in, clarifying ownership of, and authenticating said stored file.

16. Apparatus as in claims 14 and 15, further comprising means for ABC-processing each of said segments, said means for ABC-processing further comprising:
  a first-stage filter for averaging over frequency using a symmetric unity-gain filter employing a Hanning window with 41 coefficients; and
  a second-stage filtering for averaging over frequency using a symmetric unity-gain FIR filter employing a Hanning window with 11 coefficients and circular convolution;

a third stage filter;

means for setting the threshold of said first-stage filter to the estimate of the average noise power said segments; and means for setting the threshold of said second-stage and said third-stage filters to zero.

17. Apparatus as in claim 16, wherein said files are audio files.

18. Apparatus as in claim 17, further comprising means for simulating unauthorized changes to a data file, wherein all of the least significant bits of the 16-bit audio samples are set to "zero".

19. Apparatus as in claims 16, wherein said files are image files.

20. Apparatus as in claim 19, further comprising means for simulating unauthorized changes to a data file, wherein all of the least significant bits of the 8-bit RGB components are set to "zero".

* * * * *